US009052949B2

(12) United States Patent
Tarasuk-Levin et al.

(10) Patent No.: US 9,052,949 B2
(45) Date of Patent: Jun. 9, 2015

(54) SCHEDULING A PROCESSOR TO SUPPORT EFFICIENT MIGRATION OF A VIRTUAL MACHINE

(75) Inventors: Gabriel Tarasuk-Levin, Mountain View, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 78 days.

(21) Appl. No.: 13/529,921

(22) Filed: Jun. 21, 2012

(65) Prior Publication Data

US 2013/0346613 A1  Dec. 26, 2013

(51) Int. Cl.
G06F 15/173 (2006.01)
G06F 9/48 (2006.01)
G06F 9/455 (2006.01)

(52) U.S. Cl.
CPC .......... *G06F 9/4856* (2013.01); *G06F 9/45558* (2013.01); *G06F 2009/4557* (2013.01)

(58) Field of Classification Search
CPC .. H04L 29/08144; H04L 29/06; G06F 15/173
USPC ......................................................... 709/226
See application file for complete search history.

(56) References Cited

U.S. PATENT DOCUMENTS

| | | | |
|---|---|---|---|
| 7,680,141 B2 * | 3/2010 | Miyake et al. ................ | 370/428 |
| 7,900,005 B2 * | 3/2011 | Kotsovinos et al. .......... | 711/162 |
| 8,364,460 B2 * | 1/2013 | Ostermeyer et al. ........... | 703/22 |
| 2009/0063749 A1 * | 3/2009 | Dow ................................ | 711/6 |

* cited by examiner

*Primary Examiner* — Vivek Srivastava
*Assistant Examiner* — Sibte Bukhari

(57) ABSTRACT

A virtualized computer system implements a process to migrate a virtual machine (VM) from a source host to a destination host. During this process, a processing unit at the source host, which is executing instructions of the VM, is scheduled so that the rate of modification of guest physical memory pages is reduced. The determination of when to schedule the processing unit in this manner may be made based on a current rate of modification of the pages, a transmission rate of guest physical memory pages from the source host to the destination host, or a prior VM migration performance.

14 Claims, 4 Drawing Sheets

SCHEDULING A PROCESSOR TO SUPPORT EFFICIENT MIGRATION OF A VIRTUAL MACHINE

BACKGROUND

In the world of virtualization infrastructure, the term, "live migration" refers to the migration of a virtual machine (VM) from a source host computer to a destination host computer. Each host computer (also referred to herein as "host") is a physical machine that may reside in a common datacenter or in distinct datacenters. On each host, virtualization software includes hardware resource management software, which allocates physical resources to run VMs on the host and emulation software which provides instances of virtual hardware devices, such as CPUs, storage devices, network devices, etc., that are interacted with by the guest system software (i.e., the software executing "within" each VM). Virtualization software running on each host also cooperates to perform the live migration of the VM.

Exemplary implementations of live migration of VMs are described in detail in U.S. Pat. No. 7,484,208 which issued on Jan. 27, 2009, and U.S. Pat. No. 7,680,919, which issued on Mar. 16, 2010. These two patents are expressly herein incorporated by reference in their entirety. In general terms, one important aspect of performing live migration is copying the state of the VM from the source host to the destination host in a manner that allows minimal or insignificant disruption of the VM's execution at the time of the transfer from the source host to the destination host. A challenging component of this state information to be transferred is the contents of the guest physical memory. A VM's guest physical memory comprises those pages of machine memory (i.e., actual physical memory residing in the host) that are mapped or allocated to the VM being migrated. The guest physical memory address space is treated by the guest system software (e.g., the guest operating system) as actual physical memory, but the guest physical memory address space is mapped by the virtualization software to physical pages of machine memory. The main reason it is challenging to transfer the guest physical memory to the destination host in a live migration is that the VM is allowed to continue to execute during the transfer, and thus the VM continues to update the guest physical memory as the guest physical memory is being copied to the destination host.

To copy guest physical memory to a destination host while the VM is executing, an iterative pre-copy scheme may be used, as described in detail in the patents incorporated by reference above. In general, the guest physical memory pages are iteratively copied to the destination host prior to execution of the migrating VM on the destination host. Such iterative copying involves multiple copying operations beginning with copying the entire contents of the guest physical memory from the source host to the destination host, then repeatedly copying the pages dirtied (i.e., written to or modified by the VM) since the previous copy operation. Provided the bandwidth for transmitting the copied pages between the source and destination hosts is high enough, the pre-copy process will eventually converge to a sufficiently small set of guest physical memory pages that can then be successfully copied to the destination host after stunning the VM on the source host, so that the VM can then be resumed on the destination host with minimal or insignificant interruption.

In some situations (e.g., in cases where the pre-copy technique described above cannot converge), the execution of the VM is transferred to the destination host before all of the pages of the guest physical memory of the VM are copied to the destination host. As the VM runs on the destination host and encounters pages that it lacks, but remain present on the source host, the VM demand faults those pages over the network from the source host. This process is called "resume during page-in" (RDPI) and enables the system to guarantee transparent migration success, even for VMs having large working sets of memory pages which have not been pre-copied.

During this period of RDPI, the failure domain of the VM is expanded to include both the source host and the destination host since the VM's memory exists on both the source host and the destination host. As a result, if either of the source host or the destination host crashes during RDPI, the VM needs to be terminated. The network connection between the source host and the destination host will also be an additional source of failure.

SUMMARY

One or more embodiments described herein relate to scheduling a processing unit to support migration of a VM. In one embodiment, one or more pauses are inserted into a sequence of instructions of a VM to retard a rate of modification of guest physical memory pages of the VM and ensure that convergence can be achieved during the VM migration process.

A method of migrating a VM running in a source host to a destination host, according to one embodiment, includes the steps of transmitting contents of a plurality of pages of guest physical memory of the VM from the source host to the destination host over a network, scheduling a processing unit that is executing instructions of the VM so as to slow down the rate at which the processing unit is executing instructions of the VM, in accordance with a transmission rate of the contents over the network, and transmitting contents of the pages that have been modified from the source host to the destination host over the network. According to another embodiment, the method includes the additional step of determining a modification rate of the pages at the source host, and the processing unit is scheduled based on some measure of a difference between the transmission rate of the network and the modification rate (e.g., transmission rate/modification rate or transmission rate−modification rate).

Further embodiments include, without limitation, a non-transitory computer-readable storage medium that includes instructions that enable a processing unit to implement one or more aspects of the above methods as well as a computer system configured to implement one or more aspects of the above methods.

DETAILED DESCRIPTION

Figure 1:
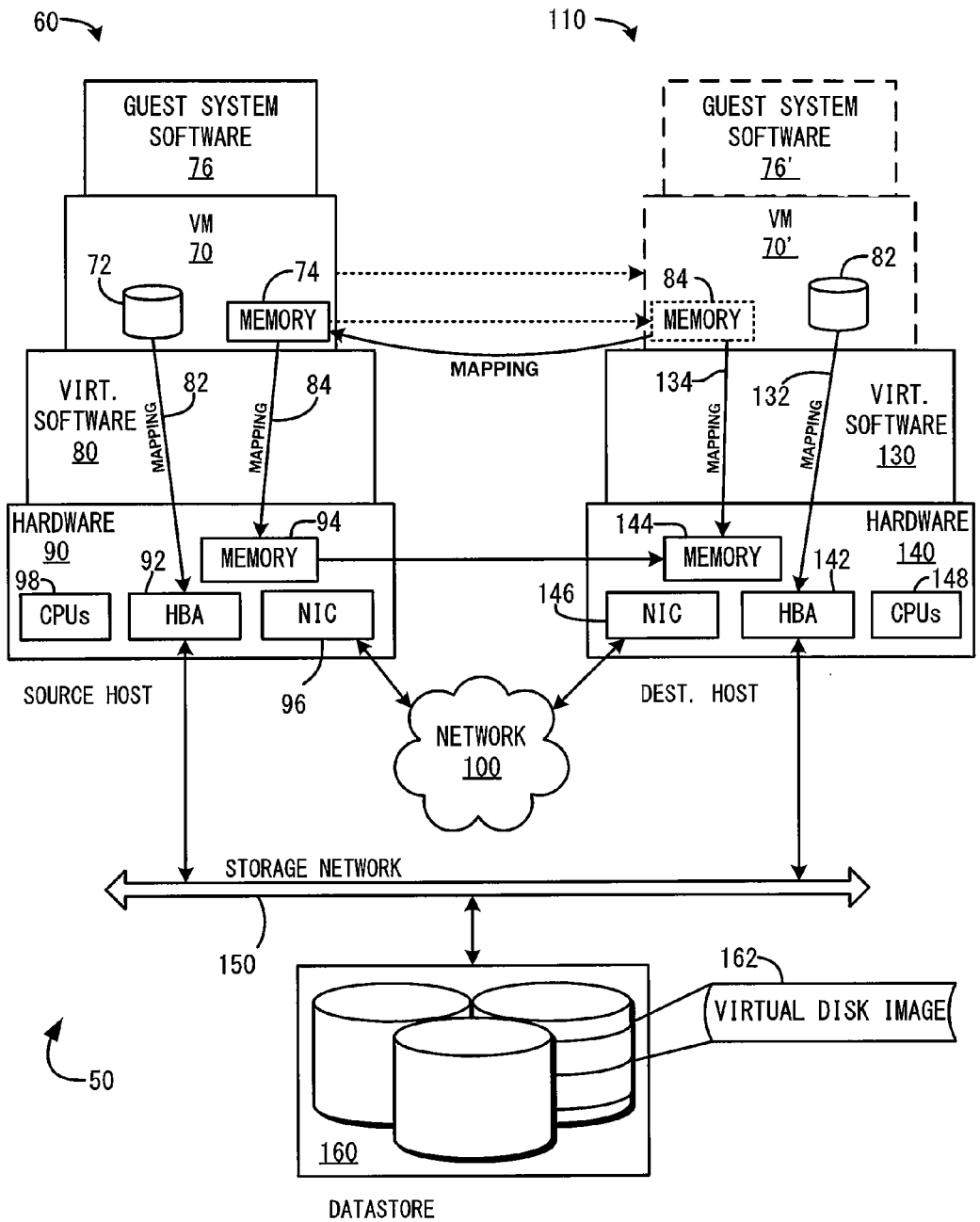
FIG. 1 is a block diagram of an overview of a virtualization infrastructure that supports a VM migration process according to one or more embodiments.

FIG. 1 is a block diagram of an overview of a virtualization infrastructure that supports a VM migration process according to one or more embodiments. A source host 60 includes a hardware platform 90 on which virtualization software 80 executes. Virtualization software 80 comprises system software (not shown) that manages and allocates hardware resources such as central processing units (CPUs) 98, machine memory 94, host bus adapter (HBA) 92 and network interface controller (NIC) 96. In addition, virtualization software 80 includes a virtual machine monitor (VMM) component (not shown) that is responsible for emulating system components to support execution of VM 70. Although only one VM is shown executing on virtualization software 80, it should be recognized that any number of VMs may execute concurrently (i.e., either time-wise interleaved on a single processor or simultaneously on a plurality of processors), the number of VMs being limited only by the sufficiency of hardware resources to support reasonable VM execution.

Virtualization software 80 is responsible for mapping virtual hardware resources associated with VM 70 to physical hardware resources so that each virtual hardware resources is backed up by some physical resource. For example, guest physical memory 74, which is memory treated by guest system software 76 as physical memory, is mapped to machine memory 94 by memory mapping 84. Memory mapping 84 may be implemented, for example, using a guest physical to machine memory page table, which is maintained by virtualization software 80. Guest system software 76 is software executing on VM 70, including a guest operating system and guest applications. The guest operating system may be a commodity operating system such as Microsoft Windows®, OS/X®, Linux®, or some other guest system software designed to execute on virtual CPU(s) (not shown) exported by virtualization software 80. Virtual disk 72 may be mapped to a virtual disk image file 162 that is maintained on datastore 160 by virtualization software 80 according to disk mapping 82 and accessible through HBA 92.

Destination host 110 includes a hardware platform 140 having physical hardware including an HBA 142, machine memory 144, a NIC 146, and CPUs 148. In addition, destination host 110 includes virtualization software 130 executing on hardware platform 140. Virtualization software 80 executing on source host 60 is in communication via network 100 with virtualization software 130 executing on destination host 110.

In response to a command from a user or an automated system (e.g., a resource scheduler such as VMware's Distributed Resource Scheduler) to live-migrate VM 70 from source host 60 to destination host 110, virtualization software 80 and virtualization software 130 cooperate to begin copying guest physical memory 74 from the source host 60 to the destination host 110. Such a command may originate over network 100. In one embodiment, virtualization software 80 accesses guest physical page tables (illustrated by mapping 84) to identify machine pages in machine memory 94 to be copied to machine memory 144 in destination host 140. This copying may occur over network 100 while VM 70 continues to execute, and therefore issue writes and reads to guest physical memory 74.

In one embodiment, guest physical memory 74 is copied from source host 60 to destination host 110 in an iterative manner, wherein at each iteration, only those pages of guest physical memory 74 that have been written to since the last iteration are copied to destination host 110. Depending on the working set of pages of whatever guest system software that is running in VM 70 and the available bandwidth of the network connection from source host 60 to destination host 110, the iterative copying of guest physical memory 74 may or may not converge on a set of pages that is sufficiently small to enable spontaneous transfer of the execution of VM 70 to destination host 110. Such situations may arise when the rate of modifying the pages of guest physical memory 74 is too high and/or the available transmission rate of the network connection is relatively low. According to embodiments described herein, as a way to ensure convergence during migration of VM 70, the effective rate of executing instructions in VM 70 is slowed down so that the pages of guest physical memory 74 are modified at a lower rate. In one embodiment, the effective rate of executing instructions in VM 70 is slowed down by inserting one or more pauses into the instruction stream of VM 70.

Figure 2:
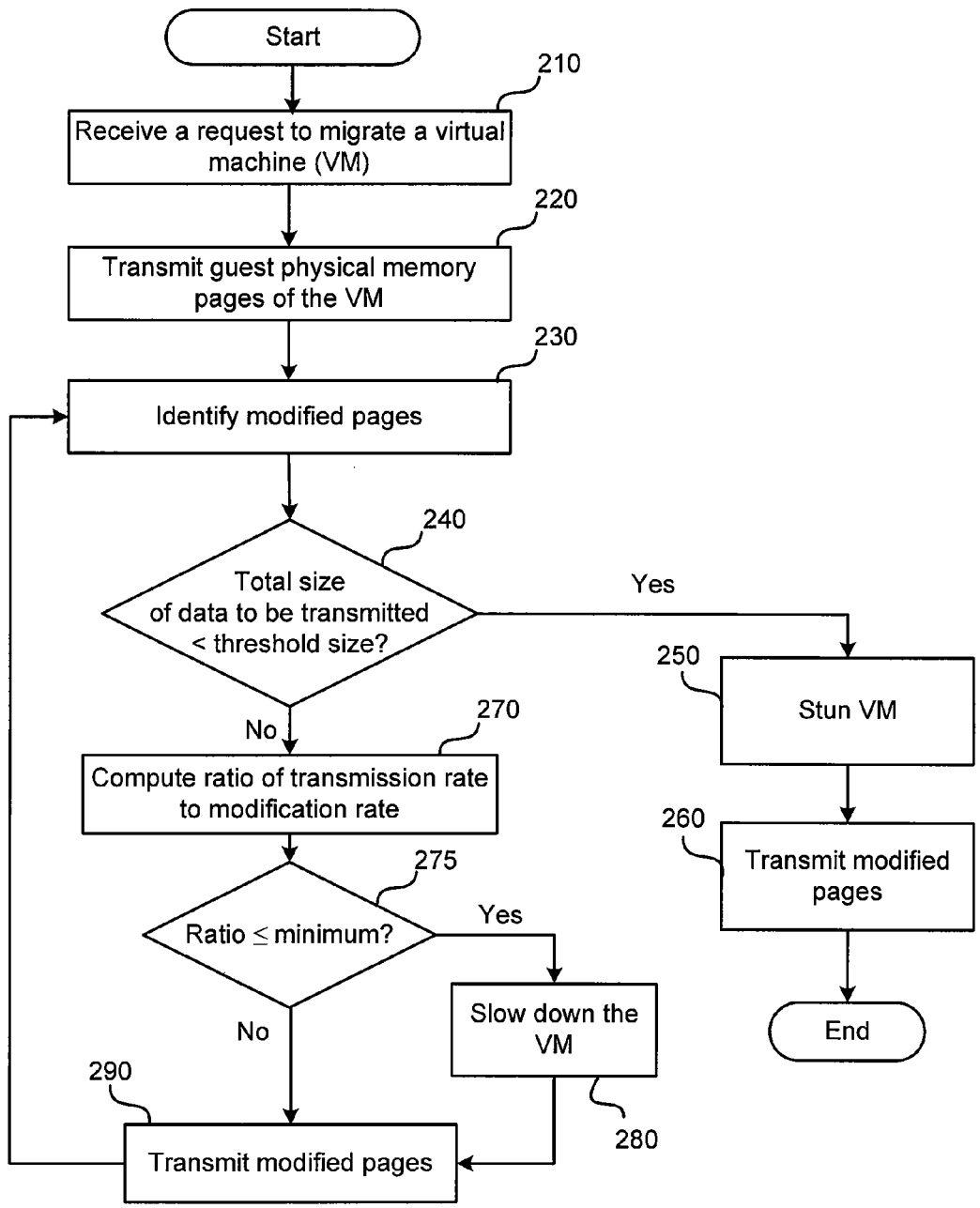
FIG. 2 is a flow diagram of a VM migration process during which the effective rate of executing instructions in the VM is reduced.

FIG. 2 is a flow diagram of a VM migration process during which the effective rate of executing instructions in the VM is reduced. In the embodiment illustrated herein, virtualization software 80 is carrying out the VM migration process to transmit all guest physical memory pages of the VM from a source host to a destination host over a network.

The process begins at step 210 where a request to migrate a VM is received at the source host. In some embodiments, the request to migrate the VM is initiated in response to a command from a user or an automated system command generated by a resource scheduler to migrate the VM. At step 220, the source host begins transmitting contents of guest physical memory pages of the VM to the destination host. It should be recognized that, while step 220 is being carried out, the VM continues to run on the source host and, as a result, there may be guest physical memory pages of the VM that are modified (i.e., dirtied). At step 230, the modified guest physical memory pages are identified by virtualization software 80. In one embodiment, virtualization software 80 maintains a dirty bitmap covering the guest physical pages, such that each time a guest physical page is modified, a corresponding bit in this dirty bitmap is set and, when a dirty guest physical page is selected for transmission, its corresponding bit in this dirty bitmap is cleared. At step 240, virtualization software 80 compares the total size of the modified pages with a threshold size. If the total size is less than the threshold size, steps 250 and 260 are executed. The VM is stunned at the source host at step 250 and the modified pages are transmitted to the destination host at step 260. Upon completion of the modified page transmission at step 260, this process terminates at the source host and the VM is resumed at the destination host.

At step 240, if virtualization software 80 determines that the total size is not less than the threshold size, step 270 is executed, where virtualization software 80 computes the ratio of a transmission rate of the pages from the source host to the destination host to the modification rate of the guest memory pages of the VM (i.e., transmission rate/modification rate), where the transmission rate is determined from the number of pages transmitted from the source host to the destination host and the time taken for this transmission, and the modification rate is determined from the number of modified pages determined at step 230 and the time period during which the modifications took place. Then, at step 275, the ratio computed at step 270 is compared with a predefined minimum ratio (e.g., 5). If the computed ratio is less than or equal to the predefined minimum ratio, step 280 is executed, where virtualization software 80 slows down the execution rate of VM instructions. In one embodiment, the slowdown in the execution rate of VM instructions is achieved by inserting one or more pauses in the instruction stream of the VM. The number of pauses or the length of pauses may be selected to be proportional to the modification rate. It should be recognized that, as a result of the slowdown, the rate at which VM is dirtying the pages of the guest physical memory will be reduced. At step 290, which is executed when it is determined at step 275 that the computed ratio is not less than the predefined minimum ratio or after step 280, the modified guest physical memory pages are transmitted to the destination host. The process returns to step 230 after step 290 for another pre-copy iteration.

Figure 3:
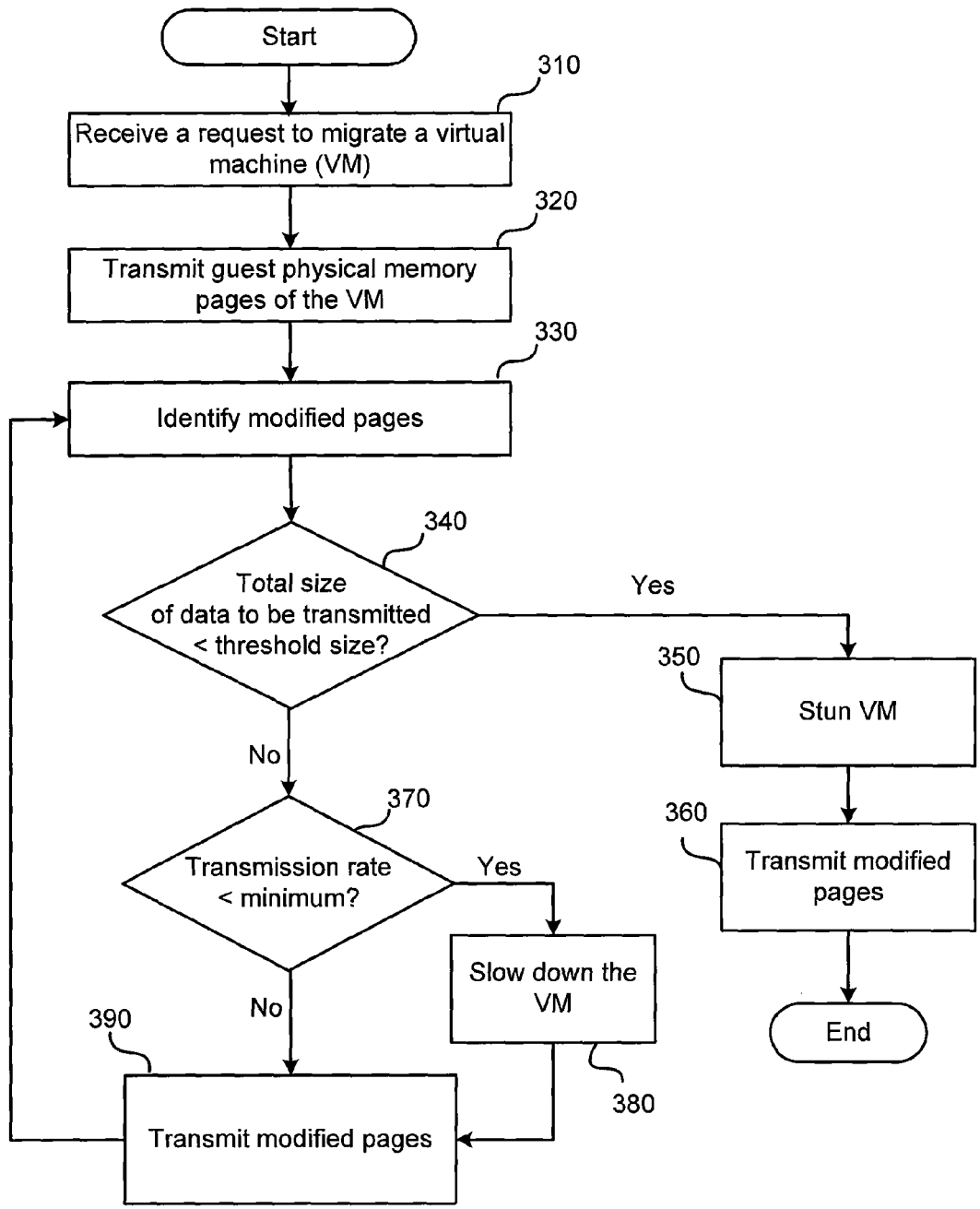
FIG. 3 is a flow diagram of a VM migration process during which the effective rate of executing instructions in the VM is reduced based on a network transmission rate.

FIG. 3 is a flow diagram of a VM migration process during which the effective rate of executing instructions in the VM is reduced based on a network transmission rate. In the embodiment illustrated herein, virtualization software 80 is carrying out the VM migration process to transmit all guest physical memory pages of the VM from a source host to a destination host over a network.

The process begins at step 310 where a request to migrate a VM is received at the source host. In some embodiments, the request to migrate the VM is initiated in response to a command from a user or an automated system command generated by a resource scheduler to migrate the VM. At step 320, the source host begins transmitting contents of guest physical memory pages of the VM to the destination host. It should be recognized that, while step 320 is being carried out, the VM continues to run on the source host and, as a result, there may be guest physical memory pages of the VM that are modified (i.e., dirtied). At step 330, the modified guest physical memory pages are identified by virtualization software 80. In one embodiment, virtualization software 80 maintains a dirty bitmap covering the guest physical pages in the same manner described above. At step 340, virtualization software 80 compares the total size of the modified pages with a threshold size. If the total size is less than the threshold size, steps 350 and 360 are executed. The VM is stunned at the source host at step 350 and the modified pages are transmitted to the destination host at step 360. Upon completion of the modified page transmission at step 360, this process terminates at the source host and the VM is resumed at the destination host.

At step 340, if virtualization software 80 determines that the total size is not less than the threshold size, step 370 is executed, where virtualization software 80 compares a network transmission rate with a predefined minimum transmission rate, where the network transmission rate is determined from the number of pages transmitted from the source host to the destination host and the time taken for this transmission. If the network transmission rate is less than a predefined minimum transmission rate, step 380 is executed, where virtualization software 80 slows down the execution rate of the VM. In one embodiment, the slowdown in the execution rate of VM instructions is achieved by inserting one or more pauses in the instruction stream of the VM. The number of pauses or the length of pauses may be selected to be proportional to the difference between the network transmission rate and the predefined minimum transmission rate. It should be recognized that, as a result of the slowdown, the rate at which VM is dirtying the pages of the guest physical memory will be reduced. At step 390, which is executed when it is determined at step 370 that the network transmission rate is not less than the predefined minimum transmission rate or after step 380, the modified guest physical memory pages are transmitted to the destination host. The process returns to step 330 after step 390 for another pre-copy iteration.

Figure 4:
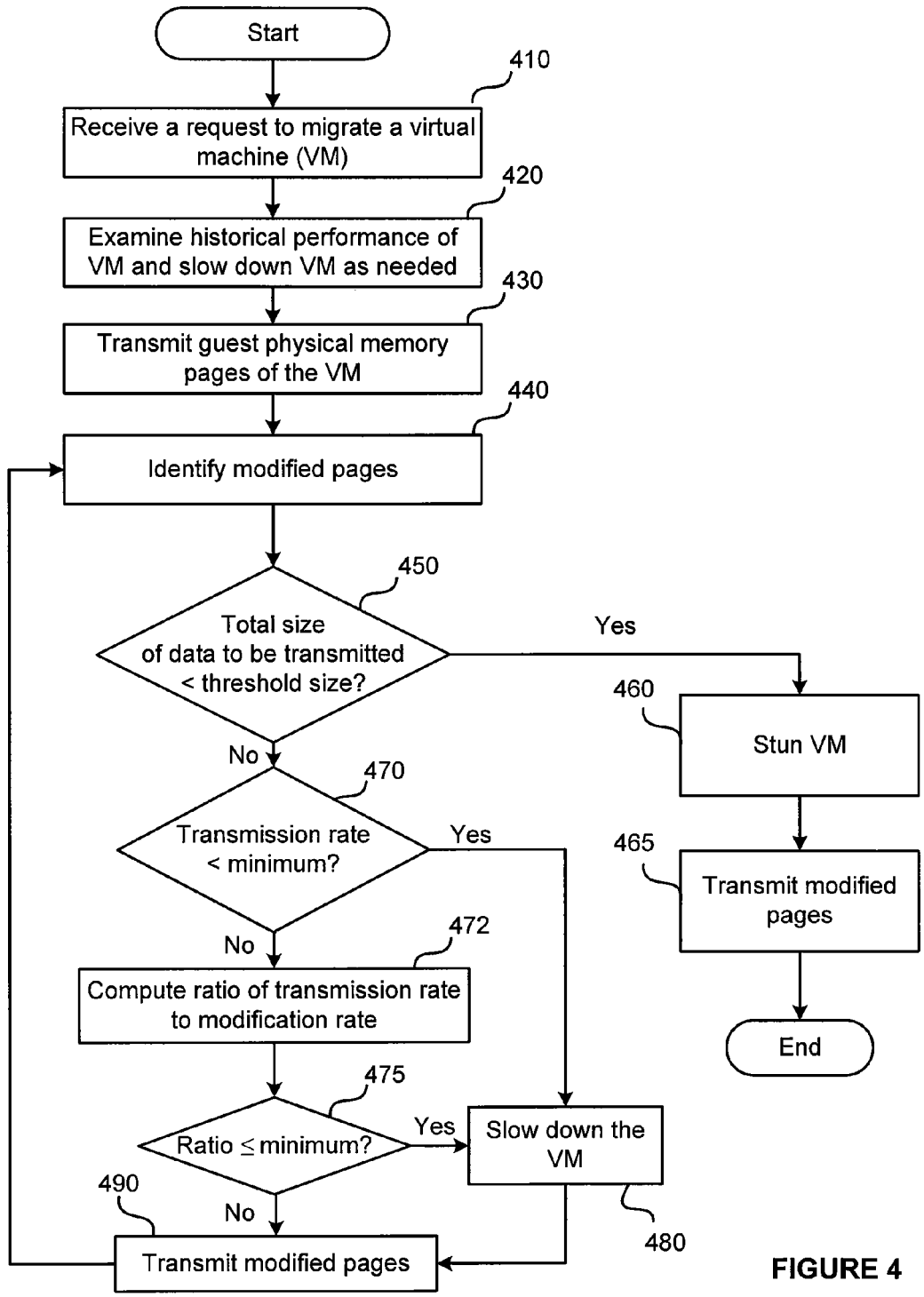
FIG. 4 is a flow diagram of a VM migration process during which historical performance of the VM is examined to reduce the effective rate of executing instructions.

FIG. 4 is a flow diagram of a VM migration process during which historical performance of the VM is examined to reduce the effective rate of executing instructions in the VM prior to any pre-copy iterations of the VM migration process. In the embodiment illustrated herein, virtualization software 80 is carrying out the VM migration process to transmit all guest physical memory pages of the VM from a source host to a destination host over a network.

The process begins at step 410 where a request to migrate a VM is received at the source host. In some embodiments, the request to migrate the VM is initiated in response to a command from a user or an automated system command generated by a resource scheduler to migrate the VM. Then, at step 420, the VM's historical performance is examined. The historical performance of the VM may include any prior computations of the VM's modification rate, e.g., in connection with a prior VM migration. If the VM's modification rate is greater than some threshold value, virtualization software 80 slows down the execution rate of the VM. In one embodiment, the slowdown in the execution rate of VM instructions is achieved by inserting one or more pauses in the instruction stream of the VM. The number of pauses or the length of pauses may be selected to be proportional to the difference between the modification rate and the threshold value.

At step 430, the source host begins transmitting contents of guest physical memory pages of the VM to the destination host. It should be recognized that, while step 430 is being carried out, the VM continues to run on the source host and, as a result, there may be guest physical memory pages of the VM that are modified (i.e., dirtied). At step 440, the modified guest physical memory pages are identified by virtualization software 80. In one embodiment, virtualization software 80 maintains a dirty bitmap covering the guest physical pages in the same manner described above. At step 440, virtualization software 80 compares the total size of the modified pages with a threshold size. If the total size is less than the threshold size, steps 460 and 465 are executed. The VM is stunned at the source host at step 460 and the modified pages are transmitted to the destination host at step 465. Upon completion of the modified page transmission at step 465, this process terminates at the source host and the VM is resumed at the destination host.

At step 450, if virtualization software 80 determines that the total size is not less than the threshold size, step 470 is executed, where virtualization software 80 compares a network transmission rate with a predefined minimum transmission rate, where the network transmission rate is determined from the number of pages transmitted from the source host to the destination host and the time taken for this transmission. If the network transmission rate is less than a predefined minimum transmission rate, step 480 is executed, where virtualization software 80 slows down the execution rate of the VM. In one embodiment, the slowdown in the execution rate of VM instructions is achieved by inserting one or more pauses in the instruction stream of the VM. The number of pauses or the length of pauses may be selected to be proportional to the difference between the network transmission rate and the predefined minimum transmission rate. At step 470, if virtualization software 80 determines that the network transmission rate is not less than a predefined minimum transmission rate, step 472 is executed, where virtualization software 80 computes the ratio of the network transmission rate to the modification rate of the guest memory pages of the VM (i.e., transmission rate/modification rate), where the modification rate is determined from the number of modified pages determined at step 440 and the time period during which the modifications took place. Then, at step 475, the ratio computed at step 470 is compared with a predefined minimum ratio (e.g., 5). If the computed ratio is less than or equal to the predefined minimum ratio, step 480 is executed, where virtualization software 80 slows down the execution rate of VM instructions. The number of pauses or the length of pauses may be selected to be proportional to the modification rate. It should be recognized that, as a result of the slowdown of the execution rate of VM instructions at step 480, the rate at which VM is dirtying the pages of the guest physical memory will be reduced. At step 490, which is executed when it is determined at step 475 that the computed ratio is not less than the predefined minimum ratio or after step 480, the modified guest physical memory pages are transmitted to the destination host. The process returns to step 440 after step 490 for another pre-copy iteration.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of migrating a virtual machine (VM) running in a source host to a destination host, the source host having at least one processing unit for executing instructions of the VM, said method comprising:
    transmitting contents of a plurality of pages of guest physical memory of the VM from the source host to the destination host over a network;
    determining a modification rate of the pages at the source host while the contents are being transmitted over the network;
    scheduling the processing unit so as to slow down a rate at which the processing unit is executing instructions of the VM based on the modification rate and a transmission rate of the contents over the network; and
    transmitting contents of the pages that have been modified from the source host to the destination host over the network;
    wherein the scheduling of the processing unit comprises inserting a pause into the instructions of the VM; and
    wherein the pause is inserted into the instructions of the VM if a ratio of the transmission rate to the modification rate is lower than a threshold value.

2. The method of claim 1, wherein the processing unit is scheduled to lower the modification rate.

3. The method of claim 1, further comprising:
    scheduling the processing unit based on a historical performance of the VM.

4. The method of claim 3, wherein the scheduling of the processing unit based on the historical performance is performed prior to transmitting contents of any of the pages of the guest physical memory of the VM.

5. The method of claim 4, wherein the historical performance of the VM corresponds to a prior migration performance of the VM.

6. A method of migrating a virtual machine (VM) running in a source host to a destination host, the source host having at least one processing unit for executing instructions of the VM, the method comprising:
    transmitting contents of a plurality of pages of guest physical memory of the VM from the source host to the destination host over a network;
    scheduling the processing unit so as to slow down a rate at which the processing unit is executing instructions of the VM based on a transmission rate of the contents over the network; and
    transmitting contents of the pages that have been modified from the source host to the destination host over the network;
    wherein the scheduling of the processing unit comprises inserting a pause into the instructions of the VM;
    wherein the pause is inserted into the instructions of the VM if the transmission rate is lower than a threshold amount.

7. The method of claim 6, wherein the processing unit is scheduled to lower a modification rate of the pages.

8. The method of claim 6, further comprising:
scheduling the processing unit based on a historical performance of the VM.

9. The method of claim 8, wherein the scheduling of the processing unit based on the historical performance is performed prior to transmitting contents of any of the pages of the guest physical memory of the VM.

10. The method of claim 9, wherein the historical performance of the VM corresponds to a prior migration performance of the VM.

11. A non-transitory computer-readable storage medium comprising instructions for causing a computing device to carry out a method of migrating a virtual machine (VM) from a source host to a destination host, the source host having at least one processing unit for executing instructions of the VM, said method comprising the steps of:
transmitting contents of a plurality of pages of guest physical memory of the VM from the source host to the destination host over a network;
scheduling the processing unit so as to slow down a rate at which the processing unit is executing instructions of the VM based on a transmission rate of the contents over the network; and
transmitting contents of the pages that have been modified from the source host to the destination host over the network;
wherein the method further comprises determining a modification rate of the pages at the source host, and the processing unit is scheduled based on the modification rate and the transmission rate of the network;
wherein the scheduling of the processing unit comprises inserting a pause into the instructions of the VM; and
wherein the pause is inserted into the instructions of the VM if a ratio of the transmission rate to the modification rate is lower than a threshold value.

12. The computer-readable storage medium of claim 11, wherein the processing unit is scheduled to lower a modification rate of the pages.

13. The computer-readable storage medium of claim 11, wherein the method further comprises scheduling the processing unit based on a historical performance of the VM prior to transmitting contents of any of the pages of the guest physical memory of the VM.

14. The method of claim 1 further comprising:
setting bits corresponding to the plurality of pages of guest physical memory in a bitmap such that a corresponding bit in the bitmap is set when a page of guest physical memory is modified while the contents of the pages are being transmitted over the network; and
clearing a bit corresponding to a modified page of guest physical memory after the page has been transmitted;
wherein a page of guest physical memory is determined to have been modified if its corresponding bit in the bitmap is set.

* * * * *